US006998856B2

(12) United States Patent
Sterling

(10) Patent No.: US 6,998,856 B2
(45) Date of Patent: Feb. 14, 2006

(54) APPARATUS FOR SENSING THE POSITION OF A POINTING OBJECT

(75) Inventor: Hans Rudolf Sterling, Cape Town (ZA)

(73) Assignee: Ethertouch, (MY)

(*) Notice: Subject to any disclaimer, the term of this patent is extended or adjusted under 35 U.S.C. 154(b) by 0 days.

(21) Appl. No.: 10/482,356

(22) PCT Filed: Jun. 28, 2002

(86) PCT No.: PCT/IB02/02494

§ 371 (c)(1), (2), (4) Date: Dec. 29, 2003

(87) PCT Pub. No.: WO03/005293

PCT Pub. Date: Jan. 16, 2003

(65) Prior Publication Data

US 2004/0178995 A1 Sep. 16, 2004

(30) Foreign Application Priority Data

Jun. 29, 2001 (ZA) ................................ 2001/5403

(51) Int. Cl.
*G01R 27/26* (2006.01)

(52) U.S. Cl. ...................................... 324/671; 324/672

(58) Field of Classification Search ........ 324/658–663, 324/671, 672, 115
See application file for complete search history.

(56) References Cited

U.S. PATENT DOCUMENTS

| | | | | |
|---|---|---|---|---|
| 4,302,011 | A * | 11/1981 | Pepper, Jr. | 463/37 |
| 4,617,512 | A * | 10/1986 | Horner | 324/678 |
| 4,694,279 | A * | 9/1987 | Meno | 341/6 |
| 5,844,415 | A * | 12/1998 | Gershenfeld et al. | 324/663 |
| 5,959,456 | A * | 9/1999 | Whorlow et al. | 324/662 |
| 6,025,726 | A * | 2/2000 | Gershenfeld et al. | 324/671 |
| 6,061,050 | A * | 5/2000 | Allport et al. | 345/173 |
| 6,326,564 | B1 * | 12/2001 | Komatsu et al. | 178/18.01 |
| 2002/0154039 | A1 * | 10/2002 | Lambert et al. | 341/33 |

* cited by examiner

*Primary Examiner*—Anjan Deb
(74) *Attorney, Agent, or Firm*—Reed Smith LLP; Harry K. Ahn

(57) ABSTRACT

A computer system (10) includes a keyboard (11), a first pair of position-sensing electrodes (18.1 and 18.2), a second pair of position-sensing electrodes (20.1 and 20.2), a signal injection electrode (22) and an oscillator (27). The oscillator injects a signal via the electrode (22) and the operators left hand L, creating a field around the operator's right hand R. The position electrodes are arranged underneath the keyboard and sense the strenght of the field enabling the position of the operator's right hand R in an X-Y plane above the keyboard to be determined. Each position-sensing electrode is coupled to a difference amplifier (28 and 30) via a pair of buffer amplifiers (40.1, 40.2, 30.1, 30.2). The amplification factor of the buffer amplifiers can be varied so as to scale the field strength values sensed by the electrodes, thereby permitting the output of the difference amplifier to be varied so as to adjust the sensivity of the system to different positions of the operator's hand R.

20 Claims, 9 Drawing Sheets

APPARATUS FOR SENSING THE POSITION OF A POINTING OBJECT

CROSS REFERENCE TO RELATED APPLICATIONS

Cross reference is made to Rule 371 application PCT/IB02/02494 filed Jun. 28, 2002 which claims priority from South Africa patent application number 2001/5403 filed Jun. 29, 2001.

FIELD OF INVENTION

THIS INVENTION relates to apparatus for sensing the position of a pointing object with respect to a reference frame.

More particularly, it relates to apparatus for sensing the position of a pointing object with respect to a reference frame and, in response thereto, to position a cursor on a display screen.

It also relates to a method of sensing the position of a movable object with respect to a reference frame.

The display screen may be that of a computer, mobile (or cell) phone, personal digital assistant (PDA), personal organiser, electronic calculator, automatic teller machine (ATM), or the like. The pointing object may be the hand, finger or other body part of an operator, a hand-held stylus, or the like.

The term "cursor" is to be understood as encompassing a pointer or other device or symbol that is displayed on the display screen and can be moved about on the screen under control of the operator. A cursor could, for example, be used to point at or designate an icon or attribute displayed on the display screen and that may be selected.

SUMMARY OF INVENTION

According to a first aspect of the invention there is provided a method of sensing the position of a movable pointing object with respect to a reference frame, which includes:

establishing an electrical field about the pointing object;

sensing the strength of the field by arranging at least one pair of spaced sensor elements in the reference frame, the sensor elements being positioned adjacent one another, each sensor element being operable to sense the strength of the field at the location of the particular sensor element to provide a field strength value corresponding to the field strength sensed by the particular sensor element;

variably scaling the two field strength values with respect to one another; and calculating the difference between the scaled field strength values to obtain a difference value providing a control variable corresponding to the position of the pointing object in the reference frame.

According to a second aspect of the invention there is provided apparatus for sensing the position of a movable pointing object with respect to a reference frame, the apparatus comprising:

electrical field generating means for establishing an electric field about the pointing object;

at least one pair of spaced sensor elements that are positionable in the reference frame in an arrangement wherein the sensor elements are adjacent one another, each sensor element being operable to sense the strength of the field at the location of the particular sensor element to provide a field strength value corresponding to the field strength sensed by the particular sensor element;

scaling means for variably scaling the two field strength values with respect to one another; and difference calculation means for calculating the difference between the scaled field strength values to obtain a difference value providing a control variable corresponding to the position of the pointing object in the reference frame.

The sensor elements may be in the form of a pair of spaced, parallel elongate electrodes.

The apparatus may include two pairs of sensor elements, wherein the pairs of sensor elements are arranged orthogonally with respect to one another to provide for sensing of the position of the pointing object in a two-dimensional reference frame.

In another embodiment, the apparatus may include three pairs of sensor elements, wherein the pairs of sensor elements are arranged orthogonally with respect to one another to provide for sensing of the position of the pointing object in a three-dimensional reference frame.

BRIEF DESCRIPTION OF THE DRAWINGS

The invention will now be described in more detail, by way of example, with reference to the accompanying diagrammatic drawings.

In the drawings.

DESCRIPTION OF THE PREFERRED EMBODIMENTS

Figure 1:
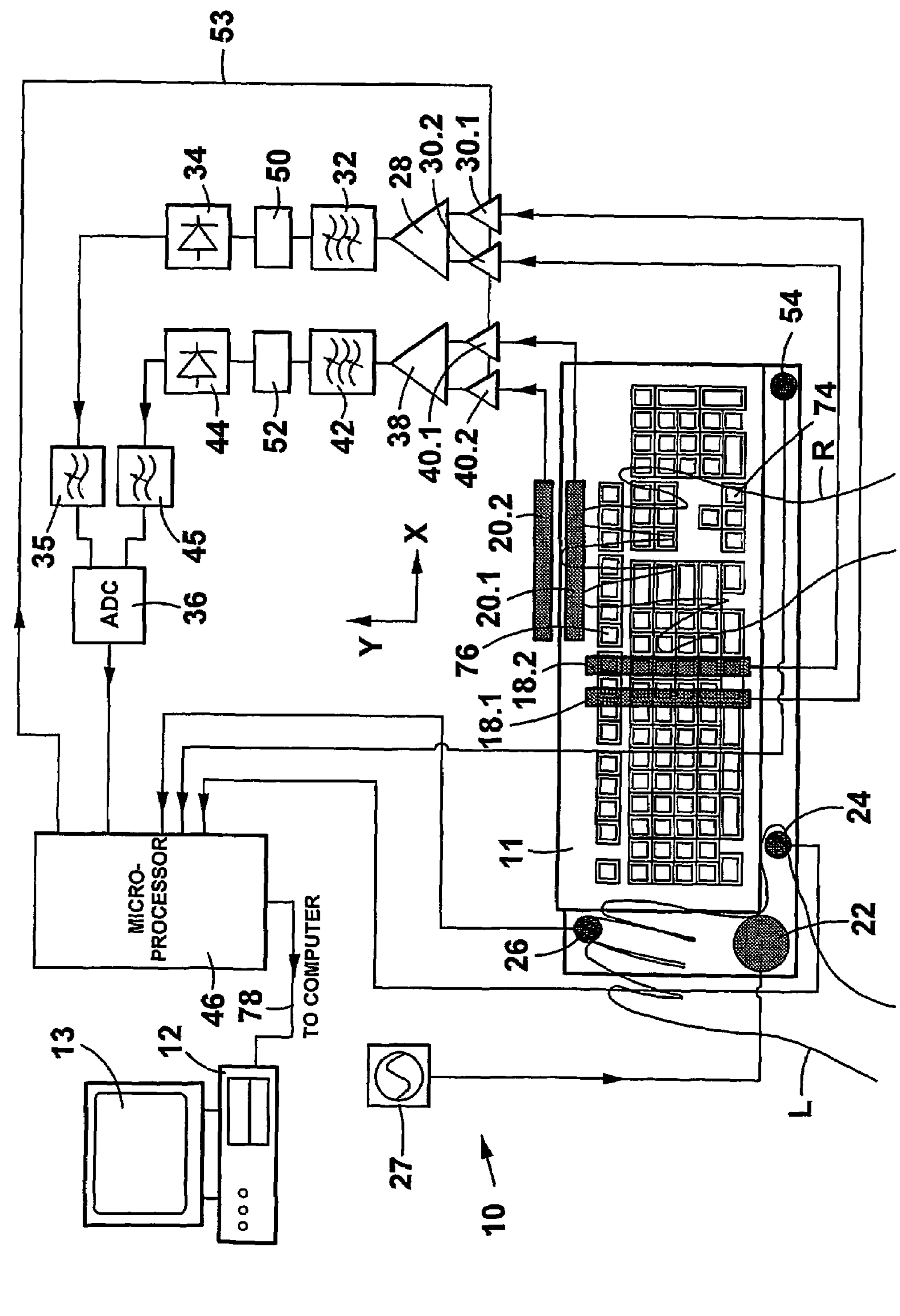
FIG. 1 illustrates a computer system according to the invention.

Referring first to FIG. 1, reference numeral 10 generally designates a computer system comprising a personal computer (PC) of the portable or desk-top type. The PC comprises various components including a keyboard 11, a microprocessor, memory, and disc drives housed in a cabinet 12, and a display device or monitor 13. These can all be of the conventional type. The keyboard 11 is connected to the rest of the PC in a conventional manner.

The keyboard 11 is provided with two pairs of spaced sensor elements or electrodes, namely a first pair of elongate sensor elements 18.1 and 18.2, and a second pair of elongate sensor elements 20.1 and 20.2. The sensor elements 18.1 and 18.2 are spaced in an X co-ordinate direction, i.e. along the length of the keyboard, and, as will be explained in more detail hereinafter, are thus able to detect the position of the operator's right hand R in the X co-ordinate direction. Reference will hereinafter be made to the pointing object R, as pointing could, instead of by the user's right hand, be effected by a finger, thumb, or any other body part of the user, by a hand-held stylus, or the like. The sensor elements 20.1 and 20.2 are spaced in the Y co-ordinate direction, i.e. in a direction perpendicular to the X co-ordinate direction, and are thus able to detect the position of the pointing object R in the Y co-ordinate direction. The sensor elements 18.1, 18.2 on the one hand, and the sensor elements 20.1, 20.2 on the other hand are arranged on two adjacent sides of a rectangular active area in the region of the keyboard.

Towards the left hand side thereof the keyboard 11 is provided with a signal injection electrode 22 and a pair of switches 24 and 26. The switches 24 and 26, and signal injection electrode 22 are so arranged that, when the operator's left hand L is placed in position on the panel for operating the switch 24 with the left thumb and the switch 26 with one of the other left hand fingers, i.e. as illustrated in the drawing, the palm of the operator's left hand will be over the signal injection electrode 22.

The system 10 further comprises an oscillator 27 which, in operation, generates an electrical signal having a frequency of about 20 kHz. The output of the oscillator 27 is coupled to the signal injection electrode 22.

The sensor elements 18.1 and 18.2 are coupled to the two inputs of a difference amplifier 28 via low impedance (virtual ground) buffer amplifiers 30.1 and 30.2 respectively. The output of the difference amplifier 28 is fed via a band-pass filter 32, a synchronous detector 34, and a low-pass filter 35 to a first of the inputs of an analogue-to-digital converter (ADC) 36. Likewise, the sensor elements 20.1 and 20.2 are connected to the two inputs of a difference amplifier 38 via low impedance buffer amplifiers 40.1 and 40.2 respectively, and the output of the difference amplifier 38 is connected via a band-pass filter 42, a synchronous detector 44, and a low pass filter 45 to a second input of the analogue-to-digital converter 36. The band-pass filters 32 and 42 each have a centre frequency which is tuned to the frequency of the oscillator 27.

The system 10 further comprises a microprocessor 46. The output of the analogue-to-digital converter 36 is connected to an input of the microprocessor 46. The switches 24 and 26 are also connected to inputs of the microprocessor 46. In one form of the invention the switches 24, 26 are provided with touch-sensitive electrodes, the arrangement being such that the microprocessor 46 is, via these touch-sensitive electrodes, able to detect whether or not the operator's left hand is in the position illustrated in the drawing, i.e. in a position in which the operator's left thumb and fingers touch the switches 24, 26. This is the position that is required for the signal from the oscillator 27 to be injected into the body of the operator via the signal injection electrode 22. It will be understood that the injection electrode 22 may be provided on a click or pressure switch, in which event this click or pressure switch will have the same effect as the switches 24, 26.

An analogue linearizer 50 is connected between the band-pass filter 32 and the synchronous detector 34. This is required to compensate for the non-linearity introduced by the fact that the sensor elements 18.1 and 18.2 are both to one side of the pointing object R. Likewise, a linearizer 52 is connected between the band-pass filter 42 and the synchronous detector 44. The linearizers can be log amplifiers, or 1/X or other suitable linearization elements.

The compensation for non-linearity can also be effected digitally, in which event it can conveniently take place in the microprocessor 46.

The gain of the amplifiers 30.1, 30.2 and 40.1, 40.2 can be controlled by the microprocessor 46, as indicated by the control line 53.

Operation of the system will now be described.

When the operator's left hand L is in the position illustrated in the drawing, the electrical signal generated by the oscillator 27 is injected via the signal injection electrode 22 into the operator's body. The injection may be effected by conduction, in which event physical contact with the electrode 22 will be required, or it may be effected by means of capacitive, electromagnetic, or radiation induction, in which event physical contact with the electrode 22 is not required. The injected signal creates an alternating electric field around the operator's body, including, via conduction through the operator's body, the pointing object R. The sensor elements 18.1, 18.2 and 20.1, 20.2 are able to detect the strength (i.e. amplitude) of this field, and from this the system is able to determine the position of the pointing object R in the X and Y co-ordinate directions. This is done in conjunction with the difference amplifiers 28, 38 and the synchronous detectors 34, 44. Any extraneous signals are filtered out by the band-pass filters 32, 42, and the synchronous detectors 34, 44 provide analogue outputs corresponding to the position of the pointing object in, respectively, the X and Y co-ordinate directions. The two analogue signals, one provided by the synchronous detector 34 and the other by the synchronous detector 44, are fed via the low-pass filters 35, 45 to the analogue-to-digital converter 36, which converts the two signals to a digital form. The microprocessor 46 serves to convert the signal into a suitable data bit-stream. The protocol of the bit-stream may be such as to emulate a standard mouse protocol required by a conventional software mouse driver resident in the PC. The bit-stream is fed to the PC and is interpreted by the computer as if it was reading data sent by a conventional mouse during normal mouse operation. Note that the analogue signal may be fed directly to the ADC and filtering may take place after being digitised (for example, in a manner as is typical in a SIGMA DELTA-type ADC) followed by a decimation filter that acts as a low pass filter.

The information contained in the bit-stream could also be transmitted to the PC via an existing data link between the keyboard and the PC, using suitable software.

The operator may operate the switches 24, 26 in the same manner as that in which the click switches of a conventional mouse are operated.

The system may also operate through other forms of energy induced in the body of the operator, such as, for example, the 50 Hz normally used for mains power and which will normally be induced in the body of the operator via cables and other electrical equipment in the vicinity of the operator, or by any other non-contact injector.

The system 10 is provided with an auto-calibration button 54 which is connected to an input of the microprocessor 46. It will be understood that the switch button 54 could also be in the form of a touch pad. When the switch button 54 is activated by means of the pointing object R, the microprocessor will perform a calibration function, correlating the position of the pointing object R and the cursor position on the computer screen 13. This is possible because the pointing object R, when activating the switch button 54, will of necessity be in a known position in the X-Y plane.

Figure 2:
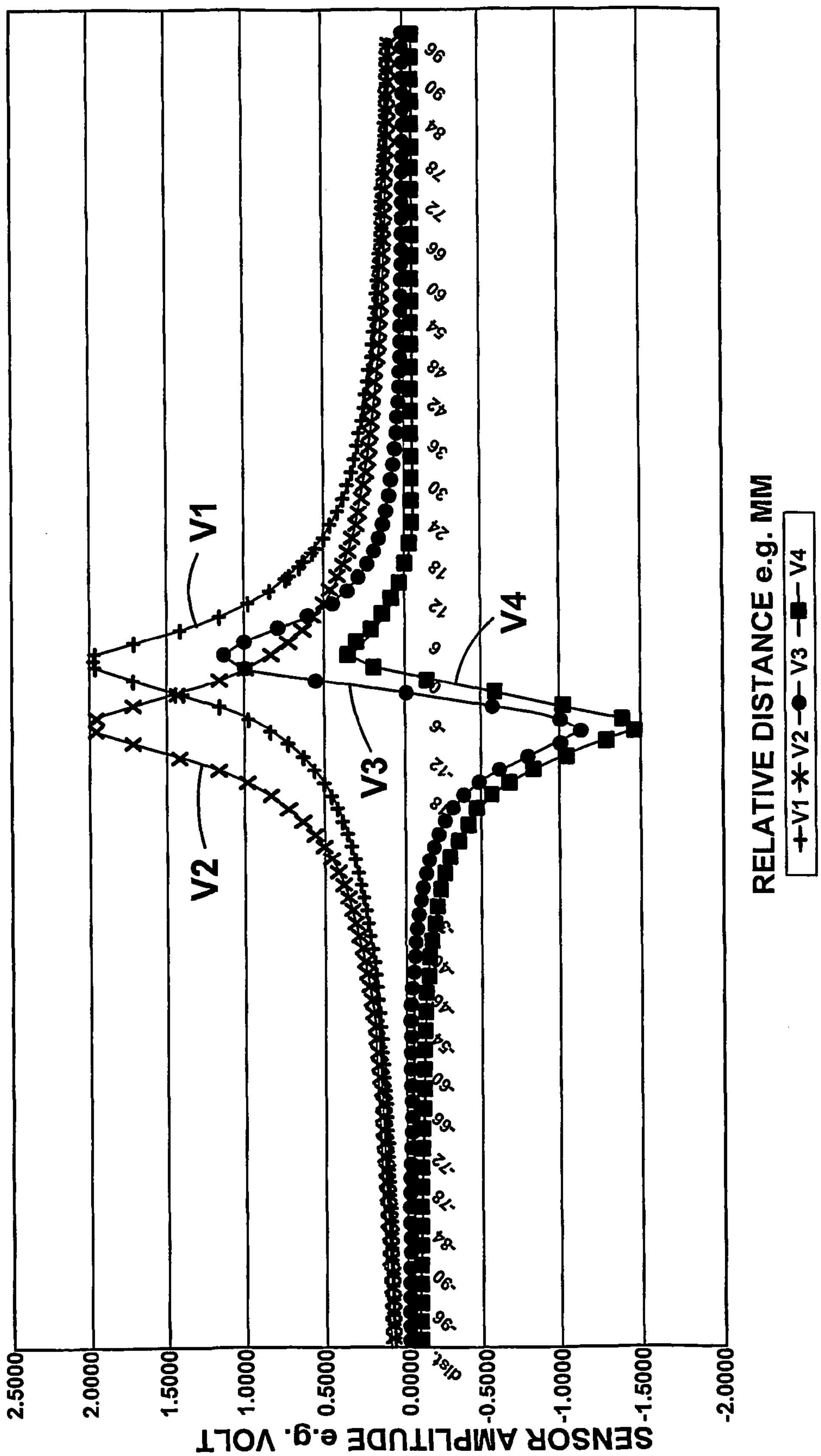
FIG. 2 shows graphs illustrating the values sensed by a pair of sensor elements which form part of the system, and the difference between the values.

Referring now to FIG. 2, V1 is a graph indicating the field strength sensed by the sensor element 18.1 at different positions of the pointing object R in the X direction. (It is to be noted that the X-direction of the graphs is opposite to the X-direction in FIG. 1.) There is a peak when the pointing object R is directly above the sensor element 18.1. Likewise, V2 is a graph indicating the field strength sensed by the sensor element 18.2 at different positions of the pointing object R in the X-direction. The peaks of the two graphs are spaced apart by a distance corresponding to the distance between the two sensor elements.

V3 is a graph indicating the difference between the field strength sensed by the sensor element 18.1 and that sensed by the sensor element 18.2 (i.e. V1−V2), where the peaks of the graphs V1 and V2 have the same height. This corresponds to the output of the difference amplifier 28, where the amplifiers 30.1 and 30.2 have the same scaling or amplification factor, i.e. where k=1, k being the ratio of the amplification factor of the amplifier 30.1 to that of the amplifier 30.2.

In these circumstances, the system is equally sensitive to the position of the pointing object R when it is to the right of the two sensor elements 18.1, 18.2 than when it is to the left of the two sensor elements.

V4 is a graph illustrating the value k×(V1−V2) where k<1. This corresponds to the output of the difference amplifier 28 when the amplification factor of the amplifier 30.1 is reduced in relation to that of the amplifier 30.2. In these circumstances the system becomes more sensitive to movement of the pointing object R to the right of the sensor elements 18.1 and 18.2 and less sensitive to movement of the pointing object to the left of the two sensor elements. Likewise, if k>1, then the system becomes more sensitive to movement of the pointing object R to the left of the two sensor elements and less sensitive to movement of the pointing object R to the right of the two sensor elements.

Figure 3:
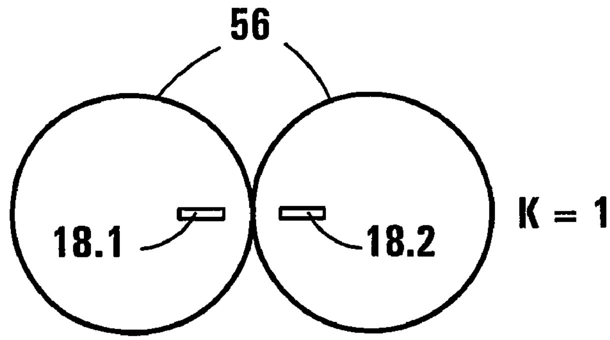
FIGS. 3, 4, and 5 are each a cross-section through a pair of the sensor elements, to schematically illustrate the operation at different settings, of the buffer amplifiers connected to the sensor elements.
Figure 4:
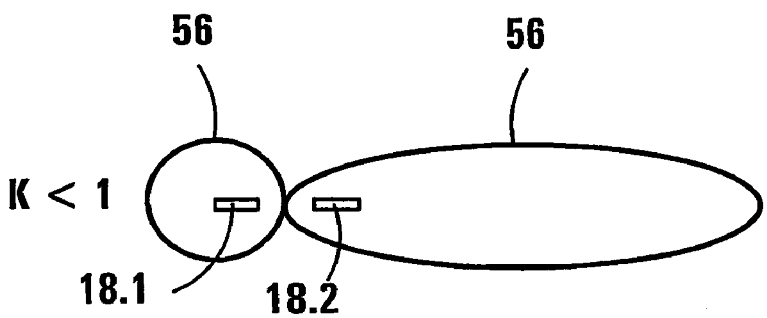
Figure 5:
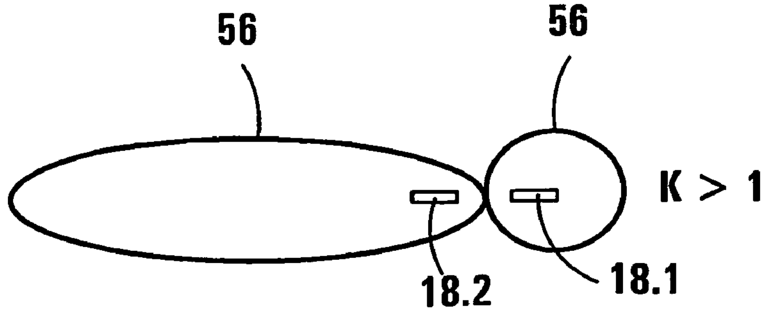

The above is illustrated in FIGS. 3 to 5, where the lines 56 indicate a predetermined threshold, beyond which movement of the pointing object R is no longer detected. Thus, if k<1, the system is sensitive to movement of the pointing object R to the right of the sensor elements, whereas, if k>1, the system is sensitive to movements to the left of the sensor elements.

Figure 6:
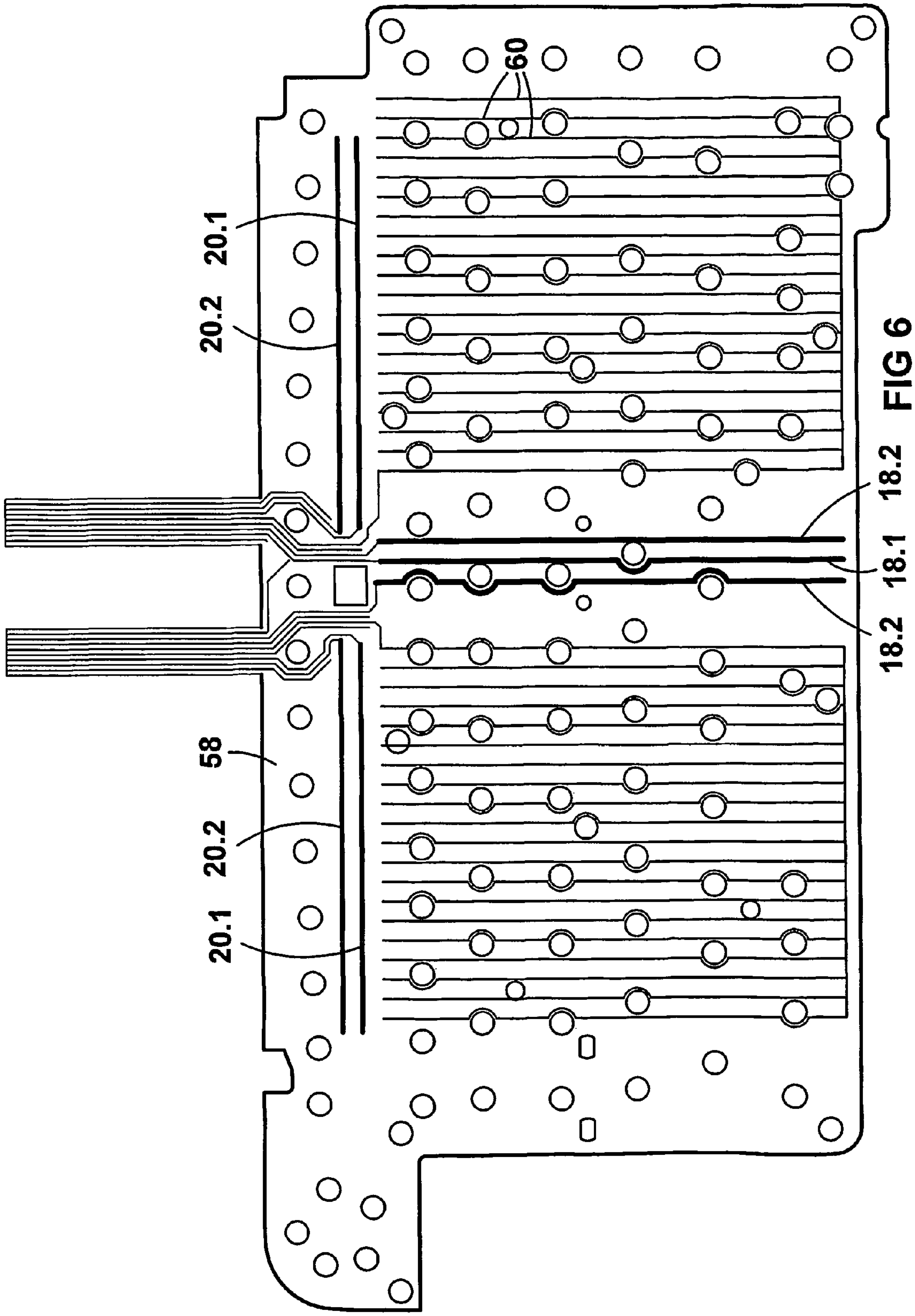
FIG. 6 illustrates a membrane with sensor elements thereon, forming part of the keyboard of a computer system in accordance with the invention.

FIG. 6 illustrates a membrane 58 of the type that is used in keyboards of laptop computers. In accordance with the invention, one of the membranes of an existing keyboard configuration (or an extra membrane that is added to the existing configuration) is provided with surface-printed sensor elements. There are two pairs of sensor elements 20.1 and 20.2, one pair being on the right hand side of the keyboard (for right-handed persons) and the other being on the left hand side of the keyboard (for left-handed persons). The system is provided with means for switching from one pair to the other, depending on whether the operator is right-handed or left-handed.

Furthermore, there is a single sensor element 18.1 and two sensor elements 18.2, one on each opposite side of the sensor element 18.1. This is done for convenience, one or other of the sensor elements 18.2 being activated to operate in conjunction with the sensor element 18.1 depending on whether the system is switched for right-handed or left-handed use.

In addition, the membrane is provided with a series of interconnected sensor elements 60 which run parallel to the sensor elements 18.1 and 18.2. The sensor elements 60 are arranged to sense the distance of the operator's hand from the keyboard, in the Z-direction (i.e. in a direction perpendicular to the X-Y plane). These sensor elements will be able, by sensing field strength, to give a coarse indication of the position of the pointing object R in the Z-direction. In this configuration the sensor elements 60 may be used to deactivate operation of the sensor elements 18.1, 18.2 and 20.1, 20.2, when the pointing object R is moved beyond a certain level above the keyboard. In an alternative form of the invention two sets of sensor elements 60 may be provided, these being spaced apart from one another in the Z-direction. Such a configuration can be used if a more accurate indication of the pointing object R in the Z-direction is required. The two sets of sensor elements 60 will in this event operate in a manner similar to that described above in relation to the sensor elements 18.1, 18.2 and 20.1, 20.2.

The invention relates to a means of detecting the absolute or relative position or gestures and movements of a body part for example a hand or finger or hand-held pointing object such as for example a pencil like device (the device may be tethered or un-tethered, passive or active), and thereby control a cursor or pointer on a electronically controlled text or graphic display screen, that allows the entry of data or gestures or character generation or selection of an icon or drawing and sketching of lines or selecting symbols similar as done by using a digitiser pad or conventional mouse or touch pad or any similar input pointing device, and a means to carry out the method.

The invention further allows unique hand or finger gestures in the air, on a wristwatch, on a electronic display screen or in mid air or on defined surface area, sensitised by one or more sensing elements, to be digitised and interpreted by a suitable electronic device such as for example during obtaining security clearance at an Automatic Teller Machine (ATM), general person identification, authentication and authorization, security clearance, authentication of documents, authorising electronic payments, credit card transactions, access control to a locked door, or for generating characters for writing, for example, SMS messages on a mobile phone or entering numbers on a mobile phone or calculator, or replacing the physical contact keys of a numeric or alpha numeric keyboard, and many more such applications, and a means to carry out the method.

The invention provides for controlling the position of a cursor on an electronically controlled visual screen such as a computer screen, LCD screen, TV screen, mobile phone screen, calculator or any other such electronically controlled displays, and a means to carry out the method. The term cursor is intended to encompass also a pointer or other device or symbol that is displayed on the screen and can be moved about on the screen under control of the user. A cursor could, for example, be used to point at or designate an icon or attribute that is to be selected and could also, for example, be used to indicate the position on the screen where gesture activated characters or symbols, are to be placed or drawn on the screen.

By placing two or more conducting sensor elements such as for example a track on a printed circuit board or a short length of wire, in parallel next to each other, say for example 1 mm to 10 mm apart, depending on the size of the active area, and the length of these sensor elements convenient for the size of the active area, and providing an AC or DC signal source radiated by the tip of a pencil-like electrode, a hand or finger or any other body part, and at a frequency from for example DC to 100 MHz, and detecting the signal strength induced in the sensor elements by this source, makes it possible to determine the position of such radiator relative to the position of the sensor elements in an X, Y, and Z axis by having the closely spaced set of conductors at only one side of the active area. This information can then be transformed to control the position of a cursor or selection of an icon or the generation of symbols and characters by gesture, and stored in memory and may be displayed on an electronically controlled display screen.

By changing the ratio of the individual sensitivity of the two parallel sensor elements for a particular application, where selected source points of unwanted signal within the operating frequency band, whether the same frequency as the wanted signal, or whether an unwanted and independent signal source of the same frequency as the wanted source or whether approaching the same wanted frequency band, the sensor elements can be made insensitive to a signal whose source is in a direction perpendicular to the two sensor elements. This electronically controlled directional selectivity may be achieved by varying this ratio by means of changing the individual sensor element amplifier gain, or by converting each of the sensor element signal strengths to a digital value first and then changing the individual sensor element values by a factor k digitally either by means of software or hardware and then subtracting the two values from each other. Alternatively, the individual sensor element surface area ratio to the second sensor element's area may be selected to give the same results as changing the gain of the input buffer amplifiers. There are various ways of changing the sensitivity of the individual sensor element such as, for example, changing the loading on each sensor or placing a resistor in series with one sensor to reduce the sensor current. This sensitivity change is very useful for eliminating unwanted noise sources with a source noise within the selective frequency band, of which the position relative to the sensor elements does not change, such as for example may be found in laptops or notebook computers as the inductor position of the power supply for the back light of the LCD screen or the position of a hard disc drive motor or head activator etc.

As the two sensor elements are in relatively close proximity, the unwanted signal noise picked up from, say, the mains (for example 50 Hz and its harmonics) or from any other noise source for example switching power supply falling within or outside the selected frequency band of operation, can be cancelled by subtracting the two received signals from each other. This is possible as long as the interfering source or noise source is further away than the furthest point of the active area with reference to the sensor elements and not greater in amplitude than the wanted signal source once processed. Narrowing the filter bandwidth will increase this immunity to signals outside the wanted frequency band so that such unwanted signals with higher amplitude will not interfere with the wanted signal. Wanted signals received from within this active area will induce a larger signal in the closer sensor than the further sensor, thus the remainder after subtracting the signals from each other will represent the distance between the sensors and this source.

Making the sensor of two closely space conductors, directionally sensitive perpendicular to the length of the conductors and thus a method of cancellation of unwanted movement on the other side of the two or more closely spaced parallel conductive sensor elements by, for example, the effect of the unwanted influence of the radiated signal generated by inadvertently moving the left hand while at the same time the right hand tries to point, can be substantially reduced by altering the signal sensitivity between the two closely spaced sensor elements.

Figure 7:
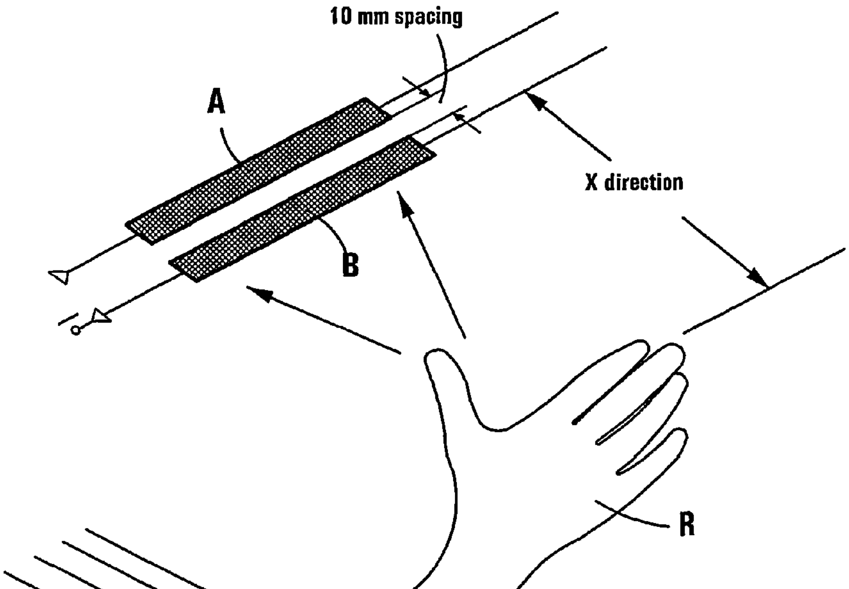
FIG. 7 illustrates the manner in which the signal strength can be calibrated to X and Y co-ordinate positions.

As is illustrated in FIG. 7 of the drawings, as the distance between the two sensor elements in one axis is fixed, for example sensor element A may be fixed 10 mm away from and parallel to sensor element B, by measuring the amplitude of the signal sensed by sensor element A and then measuring the amplitude of the signal sensed by sensor element B, and subtracting the background signal from the sensor element A value and the sensor element B value, the overall gain of the system can be determined at that point of operation. This system gain value can then be used to dynamically calibrate the signal strength to X and Y-coordinate positions, at that X and Y coordinate point, while the user is using the pointer, with good accuracy and can be implemented by a person familiar and proficient in the art of electronics and programming.

The background signal needs to be known and can be obtained by having two known X and Y coordinate points and measuring the signal strength in the sensor elements at these two points, the background signal can be deduced as referred to above, in software and can be implemented by a person familiar and proficient in the art of electronics and programming.

Because the sensor elements consist of two closely spaced, parallel conductors, and as the sensitive area may be chosen to be, for example, perpendicular and to the right of the sensor elements, the distance of sensitivity may be electronically and dynamically controlled by setting a limit on the digital value or by changing the gain of the amplifiers. This has a great advantage over sensor elements placed at the edge or circumference of the active area, as signal-radiating objects such as for example a hand or arm will not interfere with the operation of pointing.

While the user is busy pointing and the pointing object, for example the user's hand, moves over, for example, sensor element 18.2, a program may be written, by a person familiar and proficient in the art of electronics and programming, that will detect that the signal of sensor element 18.2 stays steady while the signal from sensor 18.1 is still changing. At the point where the signal from sensor 18.2 starts changing again, is a known point of distance zero to sensor 18.2. This may be used to calibrate or refine the calibration dynamically while in use and yet transparent to the user. This can be used to maintain the accuracy of the pointing system.

In access and security clearance such as electronic transaction person verification such as where traditionally, for example, a signature is used, electronic signature like movements may be used to generate a signature pattern that is unique to a particular person similar to a handwriting signature, by making personified gestures and recording these for transmission or storage and verification, remote or automatically, at a security access point.

Figure 8:
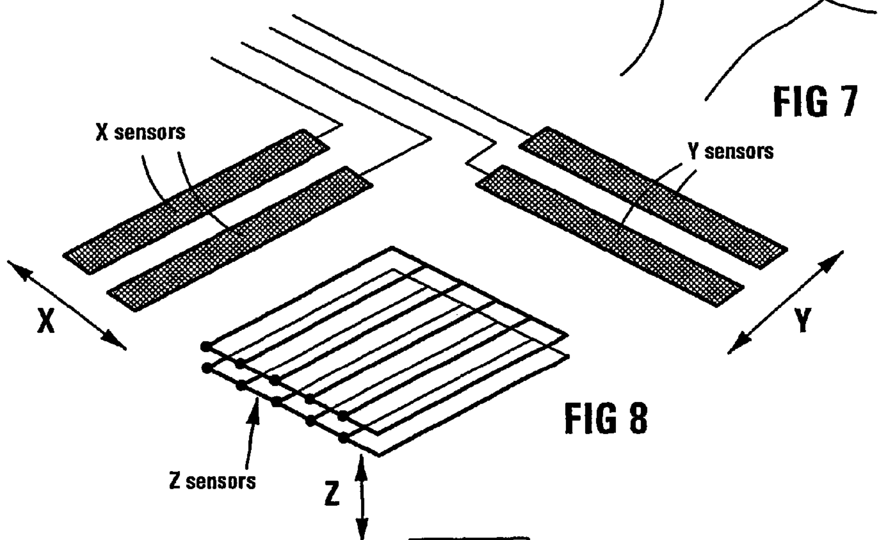
FIG. 8 illustrates the manner which Z-sensor elements can be used to form differential Z-axis sensors.

As is illustrated in FIG. 8, placing two Z-sensor elements (for example, in the form of membranes having surface-printed sensor elements) underneath one another can be used to form differential Z-axis sensors. Using the same method as described herein for X, makes it possible to eliminate noise coupled in the Z-sensor elements from, for example, electronics underneath the active area, for example the keyboard area, as would typically be found in a laptop computer implementation.

Tapping, using the height from the Z-sensor or rate of tapping by detecting the rate of change in the Z-sensor, may be used to imitate "select" as is done with a left mouse button. By introducing the source signal into the hand that is busy pointing, a one-handed pointer can be constructed by for example allowing the palm of the hand to rest on a conductive surface connected to the source 27 while pointing. The same hand can also be used for tapping to select.

Using the Z-sensor, the height of the hand can be measured and used to determine that the hand is too high for pointing accurately and thus switching the pointing function off until the hand is almost within the desired proximity of the keyboard on a PC or active area e.g. on a cell phone etc.

On a laptop keyboard or on any other selected active area, a left and right active area can be created to accommodate left handed and right handed operation by placing the X sensor elements down the middle of the keyboard or active area. The direction of sensitivity for right and left can be swapped by means of software only or by means of software controlled hardware to either swap the two X sensor elements or change the buffer amplifier gains independently. The right and left touch sensor elements may activate the left side or right side respectively. Alternatively, swapping from left active to right active may also be achieved by using a switch to switch-over from one set of sensor elements to another set, either by manual or electronic control. Alternatively, if the same area is to be used for both left and right handed operation, two sets of X sensor elements may be placed at the extreme left and extreme right of the active area and having only one set of sensor elements active at a time, the two sets may be switched over from left hand active (thus right X sensor elements selected) or right hand active (thus left X sensor elements selected) and both right and left handed operation may then be over the same active area such as for example in a large touch pad or keyboard type of application.

Figure 9:
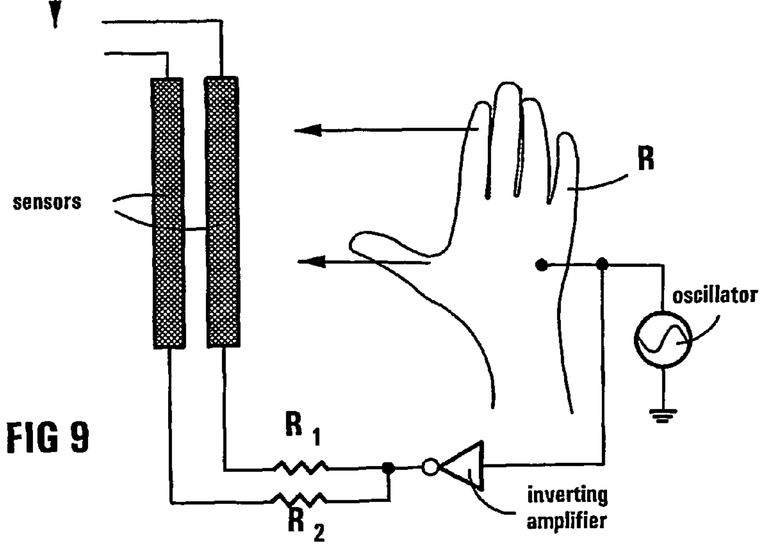
FIG. 9 illustrates the manner in which two sensor elements can be used to get rid of background-radiated signals by back-biasing the signal into sensor elements.
Figure 10:
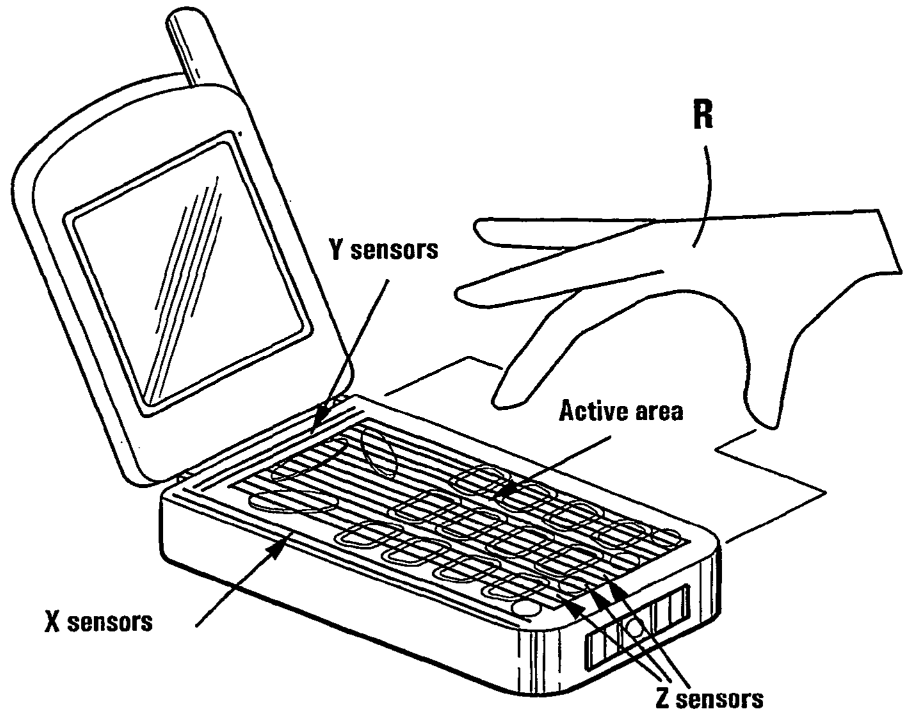
FIG. 10 illustrates the use of a membrane including position-sensing elements in accordance with the invention and defining an active area, the membrane being incorporated into the keypad of a cellular telephone.
Figure 11:
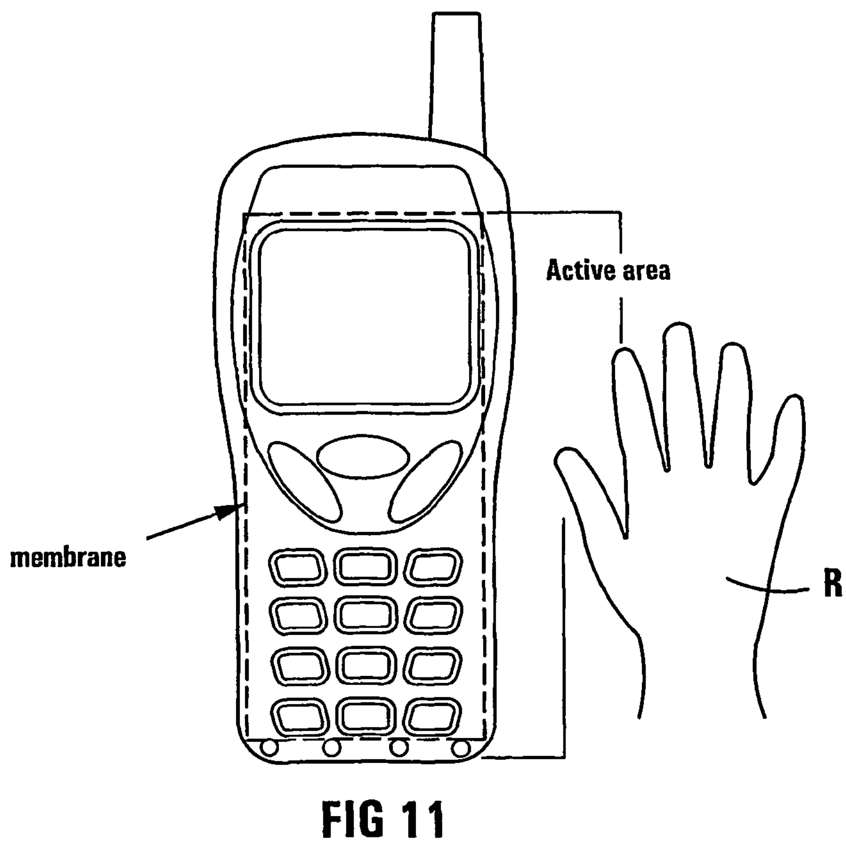
FIG. 11 illustrates the use of a membrane that is incorporated into a cellular telephone, including position-sensing elements in accordance with the invention and defining an active area encompassing the keypad and display screen of a cellular telephone.
Figure 12:
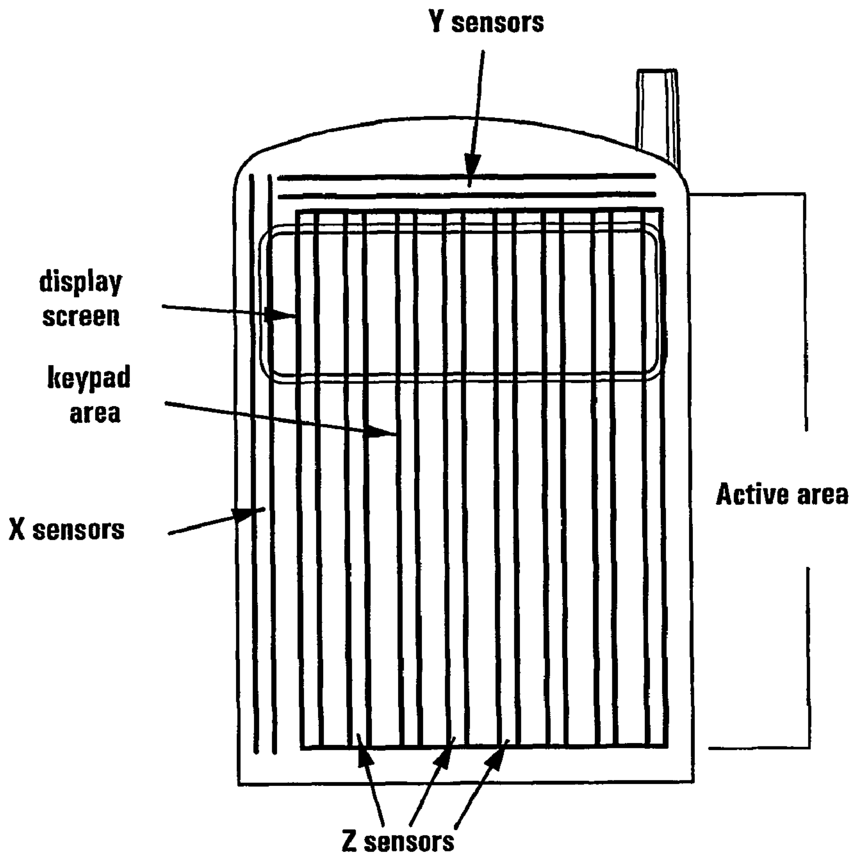
FIG. 12 shows the manner in which a membrane including position-sensing elements, is incorporated into a cellular telephone to provide an active area encompassing the keypad and display screen of a cellular telephone.
Figure 13:
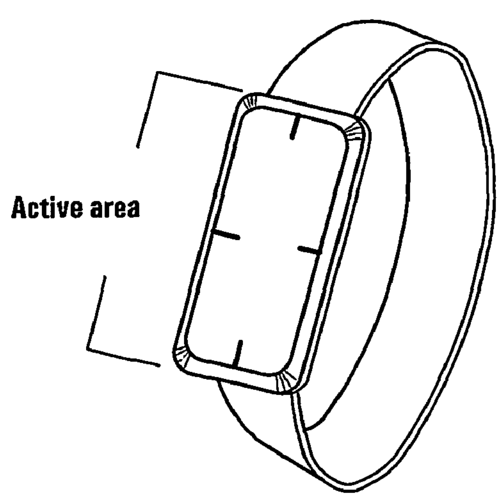
FIG. 13 shows a wristwatch having a membrane including position-sensing elements in accordance with the invention, incorporated into the display face thereof so as to define an active area above the face.
Figure 14:
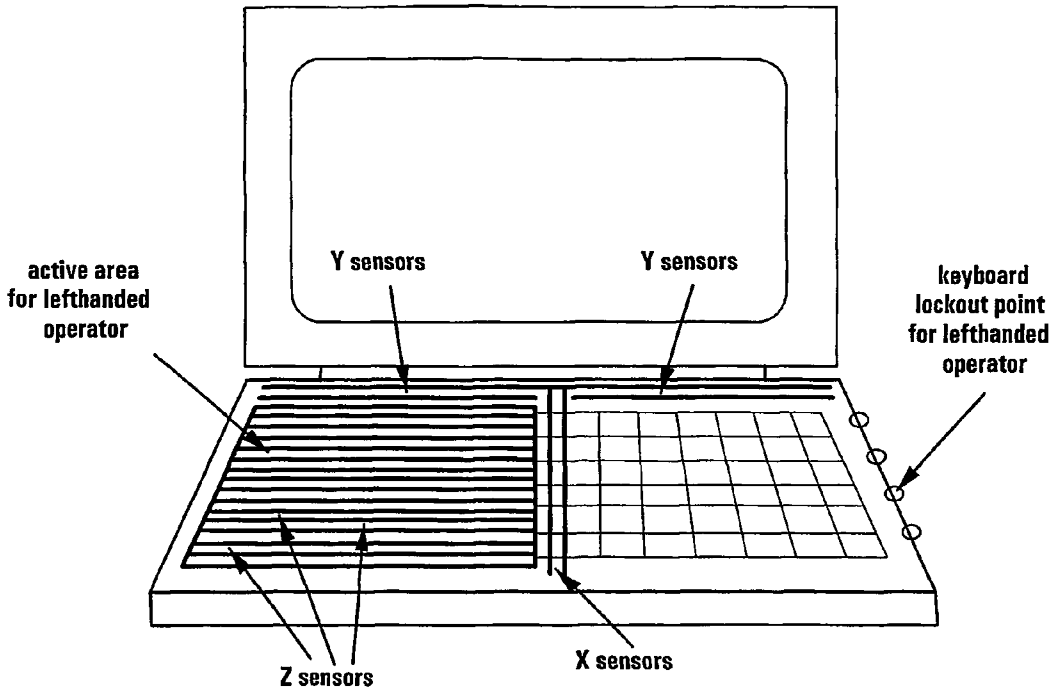
FIG. 14 shows a perspective view of a laptop computer incorporating a membrane in the keyboard region thereof, the membrane including position-sensing elements defining an active area for a left handed operator.
Figure 15:
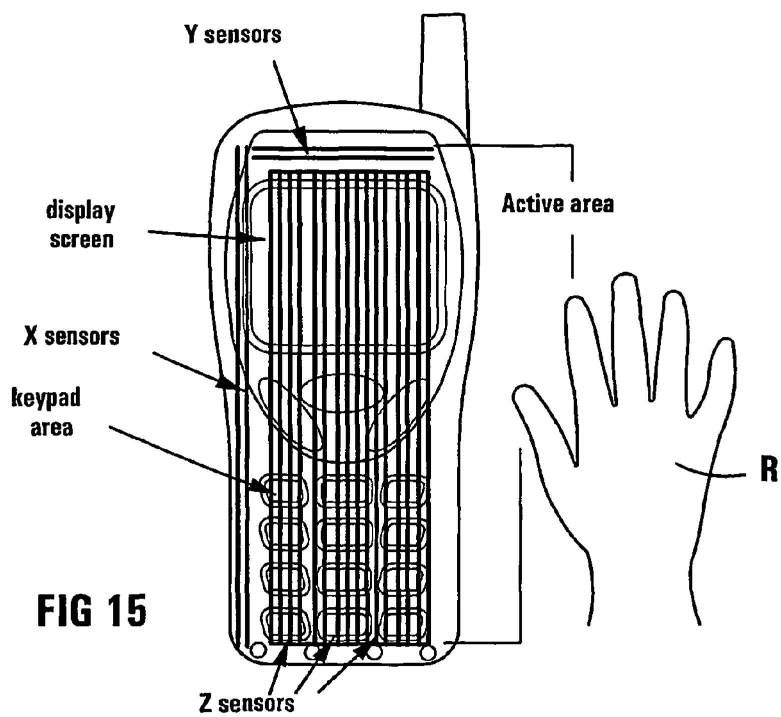
FIG. 15 shows a schematic top plan view of a cellular telephone incorporating a membrane including position-sensing elements defining an active area encompassing the display screen and keypad area.
Figure 16:
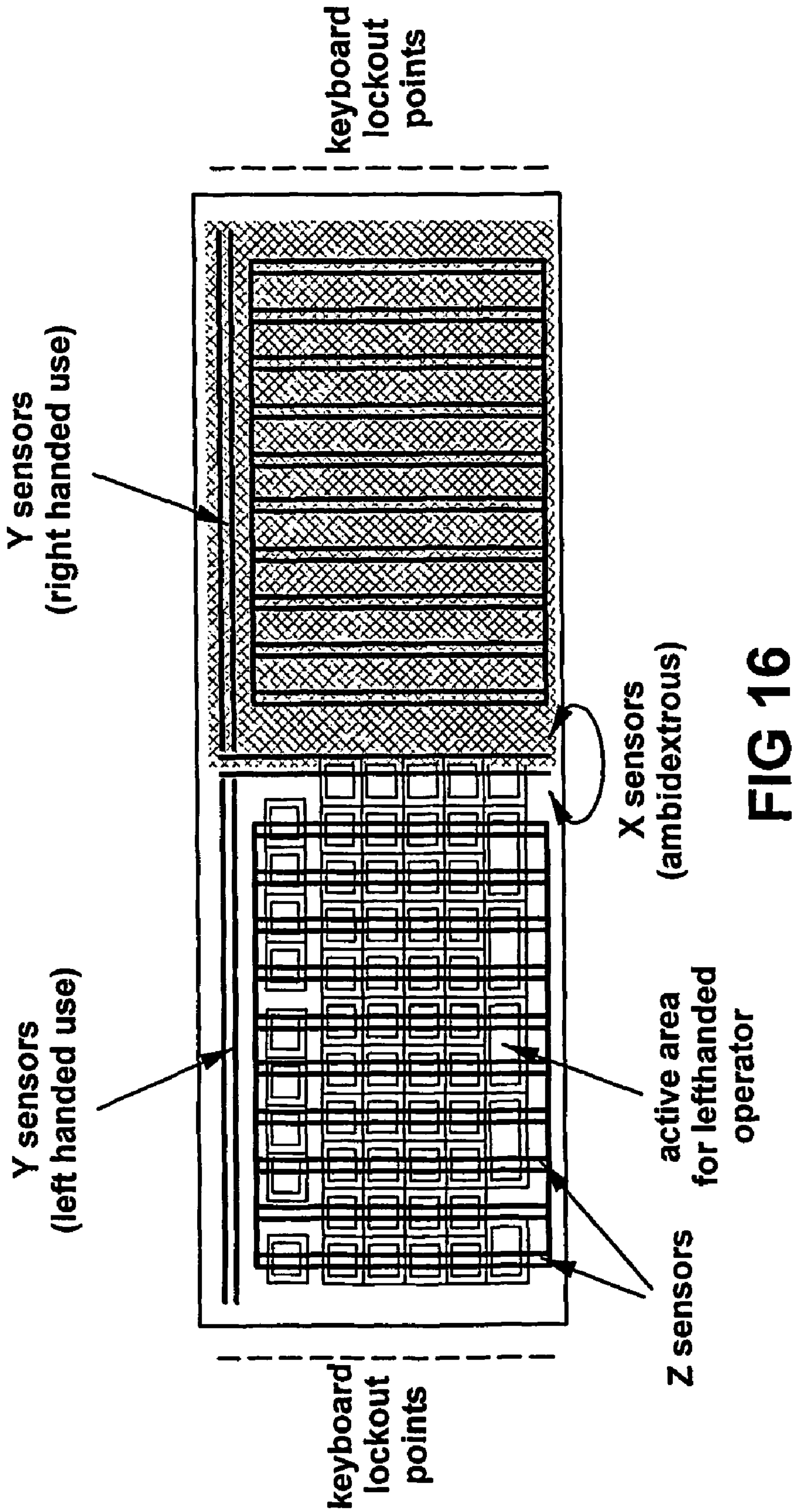
FIG. 16 shows a schematic top plan view of the keyboard of a laptop computer, illustrating a membrane similar to that illustrated in FIG. 6, that is incorporated into the keyboard and wherein the left hand side active area is activated for use by a left handed operator with the right hand side being deactivated.

As is illustrated in FIG. 9, back biasing of a signal into two sensor elements gets rid of the background-radiated signal, which results in an offset signal. This may be done by introducing a signal that is 180 degrees out of phase (or, in the case of DC, a negated potential) and thereby subtracting the equivalent value of the background from the measured level of each sensor element, as the signal presented to the sensor elements by the radiator, at the input buffer or alternatively after electronic processing in the form of an electronic signal or a numerical presentation if the subtraction is executed in the software or digital hardware.

Calibrating for changes in the unwanted background levels such as may be generated by the body as a whole, and by specific areas of the body, for example the arm or wrist or hand in some cases, or for example radiating contact elements, can be achieved by letting the stylus or body part (for example the forefinger) activate a special button located at a convenient place, for example, furthest from the X and Y sensor elements, and reading the sensor levels while this calibration button is being activated. These levels then represent the position of the calibration button. This button can take many different forms such as for example a touch electrode, a separate capacitive sensor, an optical sensor etc.

As the sensor elements can be paper thin, they do not interfere with unit thickness or shape, as the sensor elements may follow any shape and are not limited to a flat surface. This may be achieved, for example, by printing the sensor elements by means of conductive ink onto a flexible Mylar base material such as is used on membrane, laptop, and flat keyboards.

Pointing may be accomplished in mid air without having a surface area such as required for a touch pad.

According to the invention there is provided a method of positioning the cursor on the electronically controlled display screen, which method comprises causing movement of the cursor to be controlled in response to movement of the user's hand hovering over a predefined area that may be over the main key area of the keyboard or the screen or on any other chosen surface area, without interfering with the area and without any device or mechanism being held or attached to the hand that controls the cursor position. This may leave the hands in the natural position on the keyboard when controlling the cursor as when typing on the keys or pointing with the hand or a finger over a screen.

Furthermore, the invention allows the device to be retrofitted to existing standard keyboards without interfering with the keys or any other function of the existing keyboard.

In order to determine the position of the hand in relation to a predefined fixed reference frame, energy in the form of electrostatic and/or electromagnetic wave energy such as, or similar to, radio waves, may be radiated by the user's hand either by means of reception from a signal energy wave induced into the body of the user by means of capacitive coupling or electrostatic or electromagnetic energy or a combination of these, or via a signal energy wave or a fixed direct current potential injected into the user's body by means of an electrical conductive connection to the body, that may for example be located on the keyboard or other convenient position that the user may, for example, touch with his hand, or where the user's body may come in close proximity to an energy radiating element. In some cases holding a conductive pen-like stylus may extend the user's hand, and where the position of the tip of the stylus may be measured and thus known. The aforementioned induced signal energy radiated by the user's hand may be detected by means of two or more signal reception elements such as for example, suitably shaped electrical conductors selectively placed, which could act as receiver sensor elements within the fixed frame of reference. These receiver sensor elements may be mounted, for example, under the keyboard, inside the keyboard or arranged around the desired key area to form the required two or three-dimensional reference frame. The received signal amplitudes, as received by each receiving sensor element, from the signal radiated by the user's hand, may be compared with the amplitude of a selected reference sensor element that is also located within the reference frame, to derive the relative distance of the hand to these two selected sensor elements. By statically or dynamically selecting different combinations of sensor elements for comparison, as for example by means of a differential amplifier, or individually measuring the resultant signals and processing these levels in a digital form, can be used to derive the position of the hand with respect to the reference frame in a two coordinate X, Y or a three coordinate X, Y and Z direction.

In the case where the oscillator 27 is replaced by a DC generator, the buffer amplifiers 30.1, 30.2 and 40.1, 40.2 can be replaced with charge pumps and the band pass filters 32, 42 can be replaced with a low pass filter.

In order to calibrate the system and to calculate all relational differences between sensor elements 18.1 and 18.2 in digital form by means of software or logical hardware, amplifiers 30.1, 30.2 and 40.1, 40.2 may be switched by the microprocessor 46 so that one sensor element at a time may be read by the ADC 36.

When the user presses, for example, a key 74 in FIG. 1, the microprocessor recognises this as a calibration request and uses the know position of key 74 to calibrate the measured values to this point. Pressing a key 76 may do the same for the position of the key 76. This provides values for two known X and Y coordinate positions. From these two positions the background signal can be calculated. The two calibration points provide two known equations for those two points and the two variables can thus be solved. The constant of both equations represents the background.

The amplifiers 30.1, 30.2 and 40.1, 40.2 may be electronically controlled gain amplifiers. In this case the microprocessor can alter the gain ratio between the two amplifiers to perform directional optimisation in analogue hardware. This has the advantage that optimum noise cancelling, directional optimisation and calibration can be achieved by means of software. This directional capability is described in more detail elsewhere in this specification.

The sensor elements and circuitry associated with the Y coordinate direction operate in a similar way as the sensor elements and circuitry of the X coordinate direction, but the resultant potential then represents the relative position of the hand to the two sensor elements 20.1 and 20.2 in the Y coordinate direction. The two potentials are connected to the analogue-to-digital converter (ADC) 36 that processes the two signals and converts them to two digital values that represent the hand position in the X and Y coordinate relative to the reference frame. The microprocessor 46 detects these values form the ADC 16 and combines them with the status of the switches 24 and 26 and calculates the deviation of hand movement since the last read conversion, and converts these values to a serial data bit stream protocol. This data bit stream could for example emulate a standard mouse protocol such as the format and Baud rate required by software mouse drivers such as for example Microsoft Mouse or Mouse Systems protocols. Such a mouse driver would be resident in the computer and will read this data bit steam for example, by means of a cable 78 in the same way as though a normal standard computer mouse was sending data to the computer, for example by means of a serial port on the computer, and will control the cursor position on the screen 13 in a similar way as if it was reading data as sent by a standard mouse during normal mouse operation.

Alternatively, the microprocessor 46 may send the absolute position of the pointing object R with reference to the sensor elements via the cable 78, and a special mouse driver resident in the computer may direct the cursor to a position on the screen in a way that is proportional to the hand position, similar to a digitising tablet.

Two or more switches 24 and 26 are provided in a convenient position on, for example, the left side of the keyboard. In another application, any user-selected key on the key board, may replace the function of switches 24 and 26. In both cases, the left hand L of the user may control these switches by pressing when required. The user may use the right hand R to perform this function as well as the pointing by pressing any key on the keyboard. The key switches 24 and 26 are connected to the microprocessor 46. As on a conventional mouse, the two or three key switches may be provided, and may be used for the same functions as conventional mouse key switches, for example selecting or deselecting items on the video screen.

If, for example, a signal needs to be induced into the body of the user by means of conduction, a conveniently placed electrical conductor 22 connected to the oscillating signal generator 27, would touch for example the inner palm of the hand while the fingers are placed on the key switches 24 and 26. Alternatively, each key switch may have two conductive coverings on their keys, one conductive covering that may also inject the appropriate signal energy into the user's body via his hand L and the other conductive covering to detect this signal by means of the conduction of the user's finger. If the user's hand R touches one or two or more keys, the microprocessor may then interpret this as an indication that the user wishes to move the cursor with his other hand. Alternatively, a selected induced energy of frequency in the spectrum such as say 50 Hz typically similar to that contained in mains power, may be chosen instead. In that case only one conductive key covering may be present on each key, as the energy induced in the user's body comes from another source say for example the surrounding mains cables close to the computer. These conductive coverings are connected to the microprocessor 46 and act as touch sensor elements. When the user removes his hand L from the conductive key coverings on top of the keys, the microprocessor will detect this and disable the stream of data bits sent to the computer when a change in the user's hand R position is detected. This will have the effect of freezing the cursor position on the screen and the user can continue typing as usual or moving his hands about, without affecting the cursor position. Alternatively, a Z-axis sensor may initiate activating cursor movements. When the hand is a selected far enough distance from the Z-sensor, cursor movement may be disabled. The user may also press one of the key switches 24, 26 at a time, for example, to select an icon. The microprocessor 46 will detect this and send the required coded data bit stream to the computer by means of the cable 78 to the computer serial port. The mouse driver software and application software residing in the computer, will then take the appropriate action that it has been programmed for, similar to when a conventional mouse button is pressed.

This is only one example of the implementation of this invention. This implementation can be used in a number of variations to perform the same or similar tasks such as for example on a cellular phone, a personal organiser, a calculator and many more.

What is claimed is:

1. A position sensing device comprising:

an oscillator that generates an oscillating injection signal for coupling to a first body part of a human body, the injection signal generating an electric field about a second body part;

a first input operable to receive a first position signal from a first position sensing electrode that senses the strength of the electric field from the second body part in a non-contacting manner;

a second input operable to receive a second position signal from a second position sensing electrode that senses the strength of the electric field from the second body part in a non-contacting manner, the first and second position sensing electrodes being spaced from each other;

a first amplifier coupled to the first input and operable to amplify the first position signal by a first amplification factor;

a second amplifier coupled to the second input and operable to amplify the second position signal by a second amplification factor, the first and second amplification factors being dependent on the sensitivity of the first and second sensing electrodes in sensing the position of the second body part in one direction relative to the other direction; and a difference circuit connected to the first and second amplifiers and operable to determine the difference between the first and second amplified signals, the output of the difference circuit representing a position of the second body part relative to the first and second electrodes.

2. The position sensing device according to claim 1, further comprising a processor coupled to the difference circuit and operable to convert the difference circuit output to a bit stream for use by a computer.

3. The position sensing device according to claim 1, further comprising a processor operable to program the first and second amplification factors.

4. The position sensing device according to claim 1, wherein the difference circuit includes a differential amplifier.

5. The position sensing device according to claim 1, wherein the first and second electrodes include two parallel elongate electrodes.

6. The position sensing device according to claim 1, further comprising:

a processor coupled to the difference circuit; and a third input connected to the processor and operable to receive a calibration signal from a calibration sensor spaced from the first and second electrodes by a predetermined distance, wherein when the processor receives the calibration signal, the processor resets the position of the second body part to a predetermined position which corresponds to the predetermined distance of the calibration sensor from the first and second electrodes.

7. The position sensing device according to claim 1, further comprising a linearizer coupled to the difference circuit to linearize the output of the difference circuit.

8. The position sensing device according to claim 1, further comprising an inverting amplifier connected to the oscillator and to at least one of the first and second electrodes or to the difference circuit, the inverting amplifier generating an inverting signal relative to the oscillating injection signal.

9. The position sensing device according to claim 1, further comprising third and fourth inputs respectively coupled to a second pair of electrodes for sensing the distance of the second body part in an orthogonal direction to the one direction.

10. A position sensing device comprising:

an oscillator that generates an oscillating injection signal for coupling to a first body part of a human body, the injection signal generating an electric field about a second body part;

a first electrode operable to sense the strength of the electric field from the second body part in a non-contacting manner and to output a first position signal indicative of the sensed electric field strength;

a second electrode spaced from the first electrode and operable to sense the strength of the electric field from the second body part in a non-contacting manner and to output a second position signal indicative of the sensed electric field strength;

a first amplifier coupled to the first electrode and operable to amplify the first position signal by a first amplification factor;

a second amplifier coupled to the second electrode and operable to amplify the second position signal by a second amplification factor, the first and second amplification factors being dependent on the sensitivity of the first and second sensing electrodes in sensing the position of the second body part in one direction relative to the other direction; and a difference circuit whose first and second differential inputs respectively receive the first and second amplified signals, the output of the differential amplifier representing a position of the second body part relative to the first and second electrodes.

11. The position sensing device according to claim 10, further comprising a processor coupled to the difference circuit and operable to convert the difference circuit output to a bit stream for use by a computer.

12. The position sensing device according to claim 10, further comprising a processor operable to program the first and second amplification factor.

13. The position sensing device according to claim 10, wherein the first and second electrodes include two parallel elongate electrodes.

14. The position sensing device according to claim 10, further comprising a linearizer coupled to the difference circuit to linearize the output of the difference circuit.

15. The position sensing device according to claim 10, further comprising an inverting amplifier connected to the oscillator and to at least one of the first and second electrodes or to the difference circuit, the inverting amplifier generating an inverting signal relative to the oscillating injection signal.

16. The position sensing device according to claim 10, further comprising third and fourth inputs respectively coupled to a second pair of electrodes for sensing the distance of the second body part in an orthogonal direction to the one direction.

17. A method of determining the position of a body part comprising:

generating an oscillating injection signal for coupling to a first body part of a human body, the injection signal generating an electric field about a second body part;

receiving a first position signal from a first position sensing electrode that senses the strength of the electric field from the second body part in a non-contacting manner;

receiving a second position signal from a second position sensing electrode that senses the strength of the electric field from the second body part in a non-contacting manner, the first and second position sensing electrodes being spaced from each other;

amplifying the first position signal by a first amplification factor;

amplifying the second position signal by a second amplification factor, the first and second amplification factors being dependent on the sensitivity of the first and second sensing electrodes in sensing the position of the second body part in one direction relative to the other direction; and determining the difference between the first and second amplified signals, the determined difference representing a position of the second body part relative to the first and second electrodes.

18. The method according to claim 17, further comprising converting the determined difference to a bit stream for use by a computer.

19. The method according to claim 17, further comprising:

receiving a calibration signal from a calibration sensor spaced from the first and second electrodes by a predetermined distance; and resetting the position of the second body part to a predetermined position which corresponds to the predetermined distance of the calibration sensor from the first and second electrodes.

20. The method according to claim 17, further comprising generating an inverting signal relative to the oscillating injection signal for coupling to at least one of the first and second electrodes.

* * * * *